United States Patent
van der Lely

[19]

[11] Patent Number: 5,983,833
[45] Date of Patent: Nov. 16, 1999

[54] CONSTRUCTION INCLUDING A SHED FOR ANIMALS

[76] Inventor: Cornelis van der Lely, 7 Brüschenrain, Zug, Netherlands

[21] Appl. No.: 08/959,388

[22] Filed: Oct. 28, 1997

Related U.S. Application Data

[63] Continuation of application No. PCT/NL97/00082, Feb. 21, 1997.

[30] Foreign Application Priority Data

Feb. 29, 1996 [NL] Netherlands ................ 1002487

[51] Int. Cl.$^6$ ........................................ A01K 1/01
[52] U.S. Cl. ................ 119/436; 119/450; 119/447; 15/49.1
[58] Field of Search ........................ 119/517, 518, 119/525, 447, 451, 57.92, 436, 51.02, 52.1, 57.1, 57, 57.4, 57.5, 58, 163, 164, 450; 15/49.1

[56] References Cited

U.S. PATENT DOCUMENTS

| | | | |
|---|---|---|---|
| 1,243,136 | 10/1917 | Broberg | 119/451 |
| 3,557,967 | 1/1971 | Madole . | |
| 3,971,091 | 7/1976 | Peren et al. | 15/49.1 |
| 3,985,103 | 10/1976 | Gallei | 119/447 |
| 4,565,485 | 1/1986 | Wilman . | |
| 4,769,700 | 9/1988 | Pryor | 348/120 |
| 4,958,068 | 9/1990 | Pong et al. | 250/222.1 |
| 5,186,343 | 2/1993 | Bozzi | 212/206 |
| 5,195,455 | 3/1993 | Van Der Lely et al. | 119/51.02 X |
| 5,353,740 | 10/1994 | Pellerin | 119/60 X |
| 5,491,670 | 2/1996 | Weber | 367/127 |
| 5,652,489 | 7/1997 | Kawakami | 318/587 |

FOREIGN PATENT DOCUMENTS 0 473 051  3/1992  European Pat. Off. .
0 473 051  4/1993  European Pat. Off. .

*Primary Examiner*—Michael J. Carone
*Assistant Examiner*—James S. Bergin
*Attorney, Agent, or Firm*—Penrose Lucas Albright

[57] ABSTRACT

A shed for animals such as cows, having an overhead rail supported from the shed's roof which supports cleaning apparatus that is capable of being moved throughout the shed to remove manure and other debris from the floor. The cleaning apparatus includes a manure suction device, motor driven rotatable brushes and a connection to cleaning or disinfecting fluid. Containers for cleaning or disinfecting fluid and to receive manure are supported on a platform underlying the rail, the rotatable brushes and manure suction device being supported by articulated robotic arms which are controlled by piston and cylinder units to move transversely relative to the overhead rail and platform. Movement of the cleaning apparatus is guided by detectors and operatively associated controls so that the shed can be selectively cleaned. A suction device extends into the shed for removing manure into a container outside the shed as needed. A fodder pick-up device is also provided for moving fodder from a silo for distributing it into feed troughs in the shed. The pick-up device, which includes a gripping member, is also supported by a rail suspended from the shed's roof and can pick up fodder and other material at any place within the shed.

21 Claims, 3 Drawing Sheets

CONSTRUCTION INCLUDING A SHED FOR ANIMALS

RELATED APPLICATION

This is a continuation of International Application No. PCT/NL97/00082, filed Feb. 21, 1997

FIELD OF INVENTION

The invention relates to a construction including a shed for animals, such as cows, comprising cleaning means capable of being moved through the shed for cleaning the floor thereof.

SUMMARY OF THE INVENTION

An object of this invention is to improve the construction and to achieve an environment-friendly and hygienic shed as a result.

According to the invention, this is achieved by providing the cleaning means with manure pick-up means for automatically cleaning the floor of the shed. By operations of the manure pick-up means the manure is removed very quickly and efficiently from the shed floor. This also reduces the emission of ammonia to a considerable extent.

In accordance with an inventive feature, the manure pick-up means comprise gripping means and/or a manure suction device and/or shovel up means. According to a further inventive feature, the manure pick-up means can be active selectively, under computer control, in any place in the shed. Due to this excrements can be removed from the shed floor in a very short time; that is a period such as a few minutes. According to an inventive feature, the manure pick-up means are movable in height so that they can be lifted over obstacles, such as animals, railings and the like. In order to ascertain where excrements are lying on the shed floor, in accordance with an inventive feature, the cleaning means are provided with a sensor by means of which it is determined where waste material is located on the shed floor.

The invention furthermore relates to a construction including a shed for animals, such as cows, comprising cleaning means capable of being moved through the shed for cleaning the floor thereof, characterized in that there are provided in the shed one or more sensors by means of which can be determined where manure is located in the shed.

The invention additionally relates to a method of removing manure from a shed, characterized in that a monitoring system observes when and where excrements are deposited in the shed and, as soon as this is ascertained, the excrements are automatically removed from the shed. In order to realize an effective cleaning of the shed, according to another inventive feature, a manure suction device is movable on the floor in a reciprocating manner.

In accordance with a further aspect of the invention, the manure suction device comprises a robot arm construction which, at its upper side, is movable along a rail disposed at a certain height in the shed and which, at its lower side, is provided with a nozzle. The robot arm construction can be moved along the rail through the entire shed. According to a further inventive feature, the robot arm construction is constituted by a container that is movable along the rail, which container includes a manure pump and at least two pivotable arms, of which the lower one is provided with the nozzle. In accordance with a still further inventive feature, the container comprises a compartment for the manure and a compartment for the cleaning, spraying disinfecting fluid or any combination thereof. In order to guarantee a proper cleaning of the shed floor, according to an inventive feature, the manure is discharged by an arm of the robot arm construction to the manure compartment, and the cleaning spraying disinfecting fluid or a combination thereof is supplied by the other arm of the robot arm construction to a spraying device in the nozzle. In accordance with again another aspect of the invention, the nozzle is additionally provided with wheels so that it can easily be moved on the shed floor. According to the invention, the nozzle further comprises at least one motor-driven cleaning element, such as a brush. For the purpose of discharging the manure collected in the manure compartment, in accordance with yet another inventive feature, the construction comprises manure discharge means with the aid of which the manure is discharged into a manure storage tank, while there are further provided fluid supply means with the aid of which cleaning or spraying fluid, or a combination thereof, can be supplied to the fluid compartment in the container. According to an still another inventive feature, the manure discharge means comprise a manure discharge line which is capable of being connected to the container of the robot arm construction as well as a manure pump. For this purpose of connecting the manure discharge line and a fluid supply line to the container, according to a further inventive feature, the manure discharge means and the fluid supply means comprise coupling means.

In order to be able to avoid obstacles in the vicinity of the robot arm construction, according to an inventive feature, the cleaning means are provided with detection means.

The invention further relates to a construction including a shed for animals, such as cows, comprising cleaning means capable of being moved through the shed for cleaning the floor thereof, characterized in that, for the transport of goods, such as hay, soilage or manure, or a combination thereof, the construction comprises gripping means which are capable of swerving automatically when there is a cow on the path of one of these crane systems.

In accordance with a further inventive feature, the construction is provided with gripping means for picking up fodder. Therefore, the invention further relates to a construction including a shed for animals, such as cows, characterized in that the construction is provided with gripping means for picking up fodder. Fodder can be automatically transported with the aid of the gripping means, for example, from a silo to the animals' feed stands. Therefore, in accordance with the invention, the gripping means can be active selectively in any place in the shed and, according to a further inventive feature, the gripping means are movable in height. In accordance with again another inventive feature, the gripping means are provided with a sensor by means of which it can be determined whether there is fodder on the shed floor. Furthermore, according to the invention, the height or the distribution or both of the fodder on the shed floor can be determined by means of the sensor. When the fodder has been distributed irregularly, then, by means of the gripper, the fodder can be automatically distributed equally over the feed stands.

According to a further aspect of the invention, the gripping means comprises a robot arm construction, which, at its upper side, is movable along a rail disposed at a certain height in the shed and which, at its lower side, is provided with a gripper. The robot arm construction is constituted by a carrier, that is movable along the rail, and at least two pivotable arms, of which the lower one is provided with the gripper. According to a further feature, the sensor for determining the distribution as well as the height of the fodder is arranged on the carrier of the robot arm construction.

In accordance with another inventive feature, the construction comprises a feed silo from which fodder can be transported by the gripping means to the feed alley. Additionally, according to the invention, along the feed alley there can be provided sensors by means of which the height or the distribution or both of the fodder can be determined.

In the preferred embodiment, the shed is constructed as a loose house having a capacity of approximately hundred animals. For the purpose of a automating the shed, according to an inventive feature, the cleaning means or the gripping means or both are computer-controlled. According to another inventive feature, the construction comprises a milking robot.

For better understanding of the invention and to show how the same may be carried into effect, reference will now be made, by way of example, to the accompanying drawings in which:

DETAILED DESCRIPTION OF THE PREFERRED EMBODIMENTS

Figure 1:
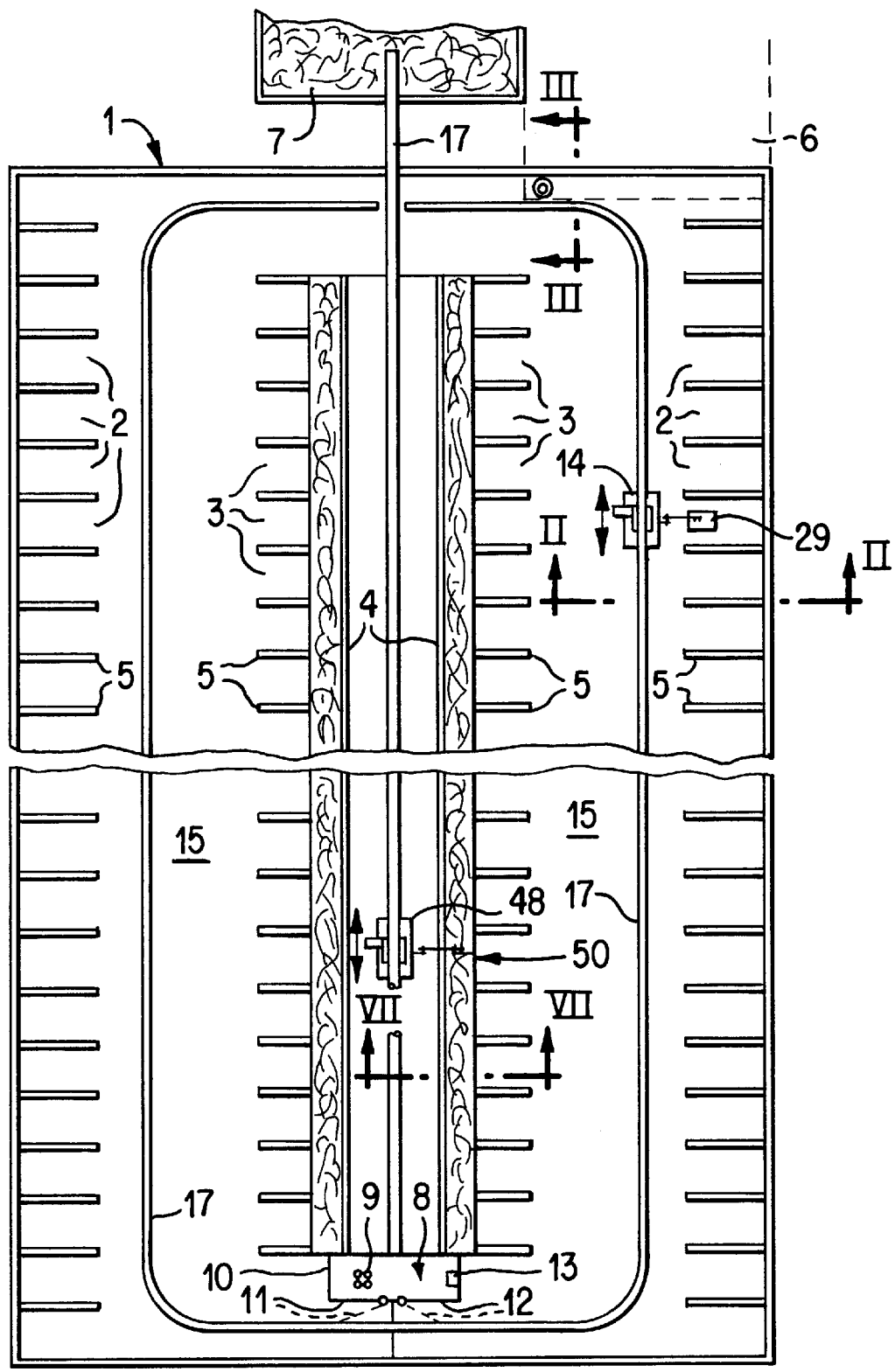
FIG. 1 shows, in plan view, a construction including a shed, in which cleaning means for cleaning the shed floor, as well as gripping means for picking up fodder are provided.

FIG. 1 shows, in plan view, a shed 1, provided on both sides with a row of cubicles 2 and in the middle with two rows of feed stands 3 including feed grooves 4. Both cubicles 2 and feed stands 3 are mutually separated by means of dividers 5.

Besides shed 1, the construction further comprises a dung-pit 6 and a feed silo 7. Additionally, at one end of feed stands 3 is a milking robot 8, by means of which teat cups 9 can be automatically connected to the teats of an animal to be milked. Milking robot 8 is disposed near a milking compartment 10, which is provided with an entrance door 11 and an exit door 12. Milking compartment box 10 further comprises a manger 13, in which concentrate can be supplied to the animal.

Figure 2:
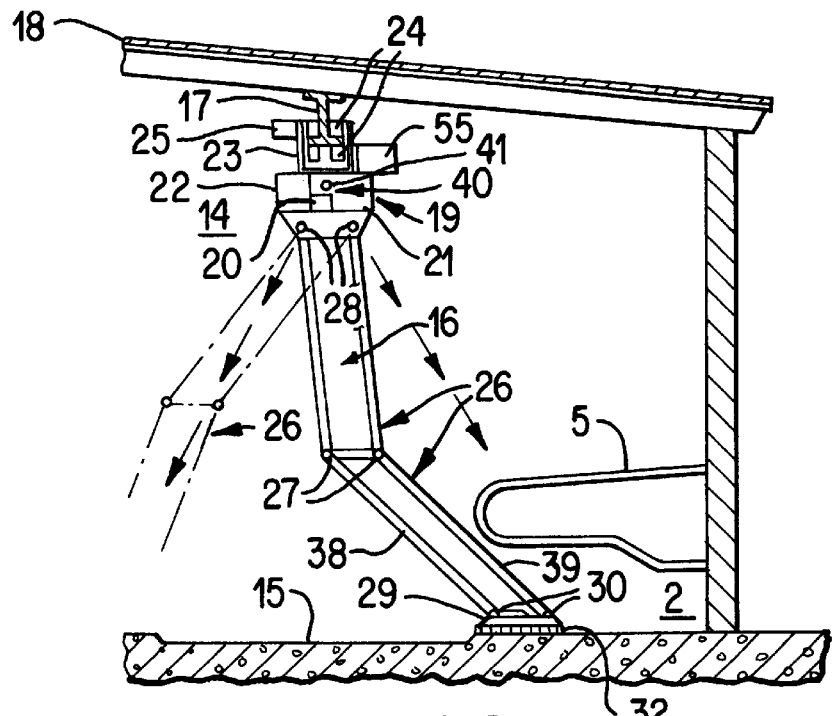
FIG. 2 shows a sectional side view of a manure suction device, taken on line II—II in FIG. 1.
Figure 3:
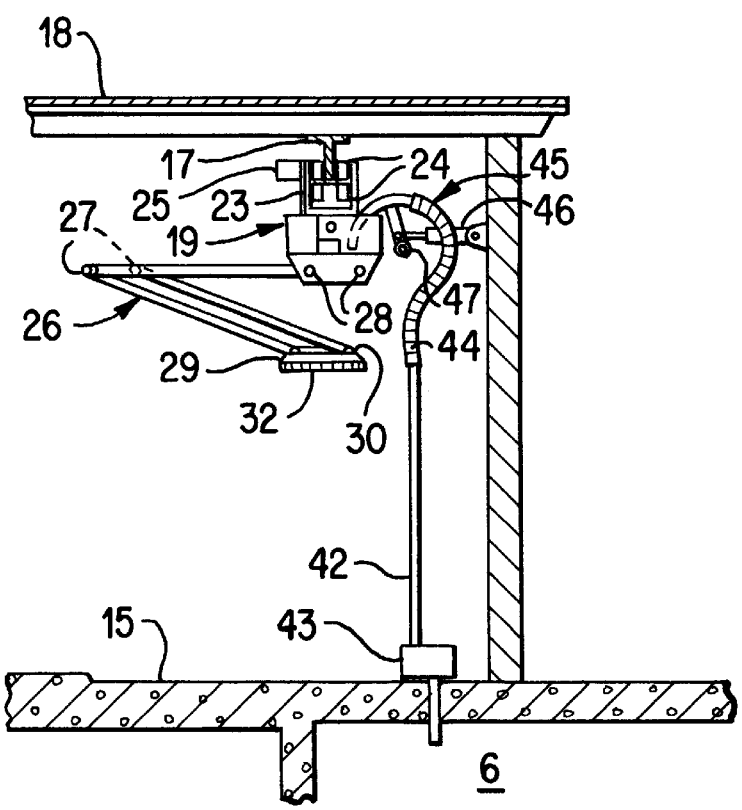
FIG. 3 is a sectional elevational view of the manure suction device, taken on line III—III in FIG. 1.

In shed 1 there are furthermore provided cleaning means 14 for cleaning the shed floor 15. Cleaning means 14 comprise a robot arm construction 16 (FIG. 2), which is movable through shed 1 under a rail 17. As shown in FIG. 2, rail 17 is constituted by an I-profile beam, which is fitted to a roof 18 of shed 1. Rail 17 extends in the form of a rectangle over the entire shed 1 and is located between feed stands 3 and cubicles 2.

As shown in FIG. 2, the robot arm construction 16 comprises a container 19 accommodating a manure pump 20, one compartment 21 for the storage of manure and one compartment 22 for the storage of a fluid for cleaning or spraying or disinfecting or any combination thereof. At the upper side of container 19 is disposed a U-beam 23, which is provided on both sides with a pair of roller elements 24 located at some distance from each other. The distance at which a roller elements 24 are apart from one another corresponds to the thickness of the I-profile of rail 17. In this manner roller elements 24 constitute a guide means for robot arm construction 16 along rail 17. One roller element 24 can be driven by an electromotor 25, preferably constituted by a step motor, which is driveable in two directions. With the aid of electromotor 25 robot arm construction 16 can be moved through the shed.

Figure 4:
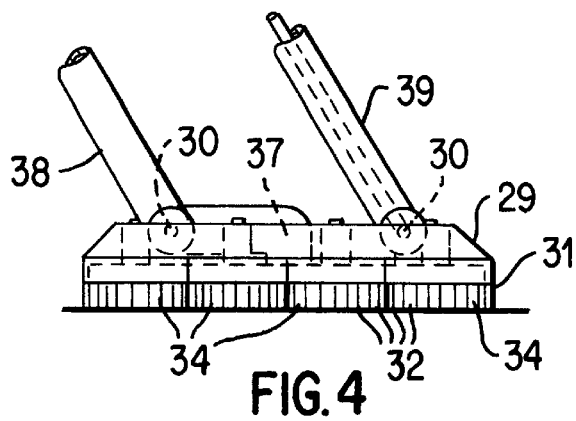
FIG. 4 is an enlarged elevational view of a nozzle of the manure suction device, according to FIGS. 1 to 3.

At the lower side of container 19 are two pivotable arms 26, constituted by two interconnected parallelogram arm constructions. The parallelogram arm constructions 26 are mutually pivotable about shafts 27, while they are pivotable about shafts 28 relative to container 19. Near the end of the lower parallelogram arm construction 26 there is disposed a nozzle 29 for sucking waste material, such as manure. Nozzle 29 is also pivotable about shafts 30 relative to parallelogram arm construction 26 (FIG. 4). The arms of parallelogram arm construction 26 are designed such that via one side of the parallelogram arm construction cleaning or spraying or disinfecting fluid or any combination thereof can be supplied to nozzle 29, while via the other side of the parallelogram arm constructions manure sucked by nozzle 29 can be discharged to compartment 21.

Figure 5:
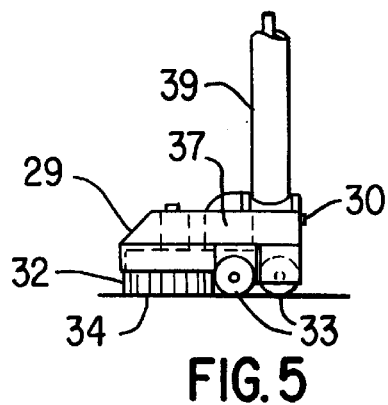
FIG. 5 is a side elevational view of the nozzle, according to FIG. 4.
Figure 6:
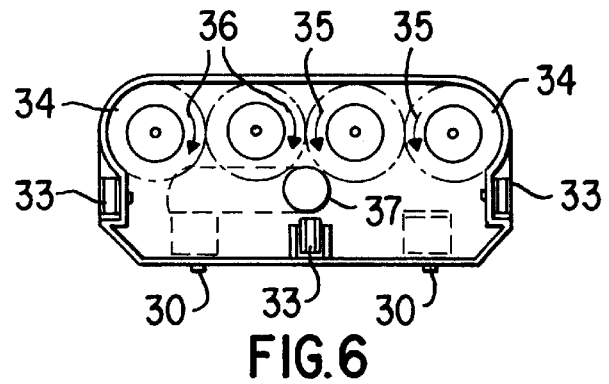
FIG. 6 is a bottom view of the nozzle, according to FIG. 4.
Figure 7:
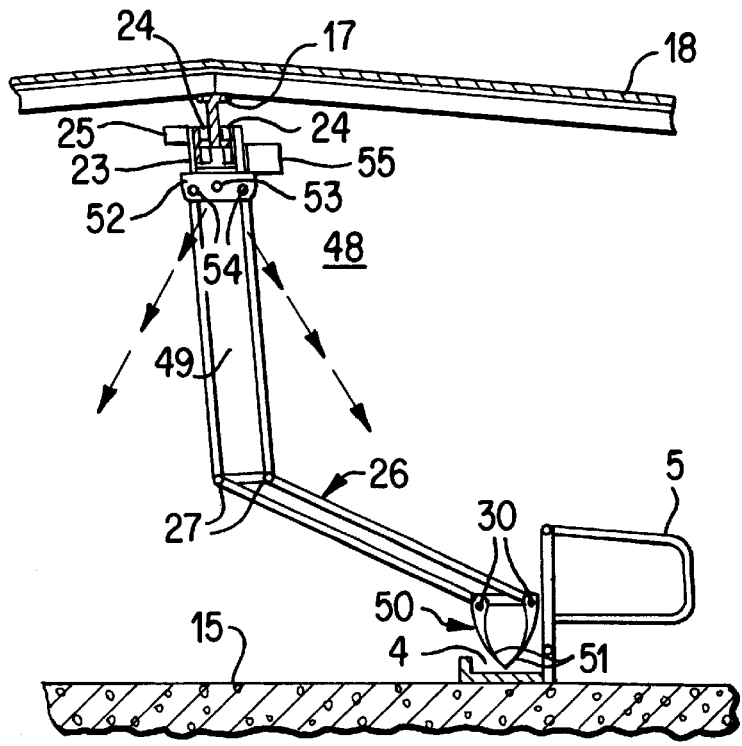
FIG. 7 shows inside elevation gripping means for picking up fodder, according to the side view as indicated by the line VII—VII in FIG. 1.

Nozzle 29 has a substantially rectangular shape and is provided at its lower side 31 with a row of brush hairs 32. At one longitudinal side and at the two ends, nozzle 29 is further supported by wheels 33, the arrangement being such that brush hairs 22 just touch shed floor 15 (FIG. 5). Near the other longitudinal side of nozzle 29 are additionally disposed four juxtaposed motor-driven circular brushes 34. Circular brushes 34 rotate in pairs in the direction of rotation indicated by the arrows 35 and 36 in FIG. 6. The two middle brushes 34, of which one rotates clockwise and the other one rotates in the opposite direction, deposit the swept up waste material to the vicinity of an opening 37 of the manure suction line 38. The cleaning or spraying or disinfecting fluid, or a combination thereof, supplied via the supply line 39 is sprayed over brushes 34 by a spraying device (not shown). During cleaning, the hairs of brushes 34 just touch the shed floor 15.

To a side wall of container 19 are further provided detection means 40 comprising a sensor 41 by means of which obstacles in the vicinity of the robot arm construction 16 can be detected. Sensor 41 can, for example, be a camera. During cleaning of shed floor 15, nozzle 29 is moved in a reciprocating manner on shed floor 15 (dashed line in FIG. 2). Furthermore, robot arm construction 16 is each time shifted a bit along rail 17, so that each time a strip of shed floor 15 can be cleaned. Additionally, it can be determined by means of the sensor 41 where excrements are lying on floor 15. In this manner robot arm construction 16 is capable of cleaning shed floor 15 very effectively. Additionally, it is possible to clean the entire shed floor 15 with the aid of the robot arm construction 16, after, for example, a predetermined interval of time or when the animals are in a meadow.

Near the dung-pit 6 is furthermore provided in the shed a manure discharge line 42 which debouches into dung-pit 6. In manure discharge line 42 is included a manure pump 43, by means of which manure collected in manure compartment 21 can be pumped into dung-pit 6. Near its upper end manure discharge line 42 is provided with a flexible tube 44 which, with the aid of coupling means 45, can be introduced into manure compartment 21 and be removed therefrom. Coupling means 45 comprise a pneumatically operated piston and cylinder anvil 46 capable of pivoting an arm 47 which is connected with manure discharge line 42. Additionally, there is provided in the vicinity of manure discharge line 42 a supply line including coupling means with the aid of which fluid compartment 22 can be replenished with cleaning or spraying or disinfecting fluid or any combination thereof.

The construction according to the invention is furthermore provided with gripping means 48 for picking up fodder. Like cleaning means 14, the gripping means 48 are capable of being used in any place in shed 1. Gripping means 48 also comprise a robot arm construction 49 corresponding to a large extent with robot arm construction 16 of cleaning means 14. Therefore, corresponding parts are designated by the same reference numerals and consequently will not be described in detail. Rail 17 along which robot arm construction 49 can be moved is also fitted to roof 18 of shed 1, more in particular in the center thereof, and extends from feed silo 7 to milking compartment 10. The lower parallelogram arm construction 26 of robot arm construction 49 is provided with a gripper 50 comprising two curved tines 51, which are pivotable about shafts 30 by means of a piston and cylinder member (not shown). Gripper 50 is capable of providing both feed grooves with fodder. The upper parallelogram arm construction 26 is connected with U-beam 23 by means of a carrier 52. On carrier 52 are detection means 53 comprising a sensor 54 by means of which the height or the distribution of fodder or both in the feed groove 4 can be detected. With the aid of sensor 54 it can further be ascertained if there are obstacles in the vicinity of robot arm construction 49. On container 19 and carrier 52 are computers 55 by means of which the components of the manure pick-up means, such as the electromotor 25, the piston and cylinders units of pivotable arms 26, the drive of brushes 34, detection means 40, manure pumps 20 and 43, piston and cylinder members 46, etc. can be automatically controlled. In a computer the height as well as the distribution of fodder in feed groove 4 can be programmed, so that the fodder is automatically distributed by means of gripping means 48. In another embodiment, four sensors may be provided along the feed groove by means of which the height or the distribution of the fodder or both can be determined so that, on the basis of such data, the operations of gripping means 48 can be controlled.

Although I have disclosed the preferred embodiments of my invention, it should be understood that it is capable of other adaptations and modifications within the scope of the following claims.

I claim:

1. A construction comprising a shed for animals, said shed including a floor, cleaning means capable of being moved throughout said shed for cleaning said floor, said cleaning means comprising manure pick-up means for automatically cleaning said floor and a container, said container supported so as to be spaced above said manure pick-up means, said manure pick-up means being movable along said floor in a different direction relative to a direction of movement of said container, said manure pick-up means including suction means for removing said manure from said floor and into said container.

2. A construction in accordance with claim 1, wherein said manure pick-up means comprises brushing means for moving manure on said floor into the vicinity of said suction means.

3. A construction in accordance with claim 1, comprising a computer control for said manure pick-up means for selectively controlling the movement of said manure pick-up means to operate at substantially any location on said floor.

4. A construction in accordance with claim 1, comprising vertical movement means for moving said manure pick-up means vertically.

5. A construction in accordance with claim 1, comprising detection means for determining the location of waste material on said floor.

6. A construction in accordance with claim 1, further comprising manure discharge means and a manure storage tank which cooperates with said manure discharge means for moving manure from said container into said manure storage tank.

7. A structure in accordance with claim 6, wherein said manure discharge means comprises a manure suction device to be received in said container, and manure pump disposed to move manure from said manure suction device into said manure storage tank.

8. A construction in accordance with claim 7, wherein said manure suction device comprises coupling means for coupling said manure suction device to said container.

9. A construction in accordance with claim 1, which comprises detection means for detecting obstacles in the vicinity of said manure pick-up means.

10. A construction comprising a shed for animals, said shed including a floor, cleaning means in said shed capable of being moved throughout said shed for cleaning said floor, sensors in said shed disposed above said floor, said sensors detecting the location of manure on said floor and guiding the movement of said cleaning means to said manure on said floor at locations throughout said shed.

11. A construction in accordance with claim 10, wherein said cleaning means includes a manure suction device, and movement means for moving said manure suction device in overlapping back and forth movements on said floor.

12. A structure in accordance with claim 11, wherein said shed comprises a roof, a rail supported by said roof, said manure suction device comprising a robot arm construction, the upper side of said robot arm construction being movable along said rail, the lower side of said movable arm construction being provided with a nozzle.

13. A construction in accordance with claim 12, wherein said nozzle is provided with wheels.

14. A structure in accordance with claim 12, wherein said nozzle is provided with a motor-driven cleaning element.

15. A construction in accordance with claim 14, wherein said cleaning element comprises a brush.

16. A construction in accordance with claim 10, wherein said shed comprises a rail and said cleaning means comprises a container which is movable along said rail, said container including a manure pump, said cleaning means further comprising two pivotal arms, a nozzle provided on at least one of said arms, suction means operatively connected to said nozzle for extracting manure on said floor to said container through said manure pump.

17. A construction in accordance with claim 16, wherein said container comprises a further compartment for receiving manure and another compartment for a further fluid.

18. A construction in accordance with claim 17 wherein said further fluid comprises a cleaning fluid.

19. A construction in accordance with claim 17, wherein said further fluid comprises a fluid for spraying.

20. A construction in accordance with claim 17, wherein said further fluid comprises a disinfecting fluid.

21. A construction in accordance with claim 16, wherein a first arm of said robot arm construction is associated with a conduit for the movement of manure from said nozzle to said compartment and the second arm of said robot arm construction is associated with a further conduit for the movement of fluid to a spraying device in said nozzle.

\* \* \* \* \*